United States Patent
Schrell et al.

(10) Patent No.: US 9,115,465 B2
(45) Date of Patent: Aug. 25, 2015

(54) PREPARATIONS COMPRISING DISPERSE DYE AND/OR UV ABSORBER

(75) Inventors: Andreas Schrell, Hofheim (DE); Clemens Grund, Hattersheim (DE); Hartwig Jordan, Bergisch-Gladbach (DE); Matthias Hofmann, Bad Tölz (DE)

(73) Assignee: DyStar Colours Distribution GmbH (DE)

( * ) Notice: Subject to any disclaimer, the term of this patent is extended or adjusted under 35 U.S.C. 154(b) by 1319 days.

(21) Appl. No.: 12/680,419

(22) PCT Filed: Sep. 19, 2008

(86) PCT No.: PCT/EP2008/062566
§ 371 (c)(1),
(2), (4) Date: Jul. 14, 2010

(87) PCT Pub. No.: WO2009/040317
PCT Pub. Date: Apr. 2, 2009

(65) Prior Publication Data
US 2010/0298471 A1    Nov. 25, 2010

(30) Foreign Application Priority Data
Sep. 28, 2007  (DE) .......................... 10 2007 046 745

(51) Int. Cl.
*C08K 5/47* (2006.01)
*D06P 1/52* (2006.01)
*C09B 67/40* (2006.01)
*C09B 67/46* (2006.01)
*D06P 3/54* (2006.01)
*C08G 63/66* (2006.01)

(52) U.S. Cl.
CPC ............. *D06P 1/5257* (2013.01); *C09B 67/009* (2013.01); *C09B 67/0082* (2013.01); *C09B 67/0089* (2013.01); *D06P 3/54* (2013.01)

(58) Field of Classification Search
CPC ......................................................... C08G 5/47
USPC ........... 524/86, 91, 83, 84, 100, 104, 207, 87, 524/110, 358, 190, 599; 8/527, 580, 528, 8/582; 528/361
See application file for complete search history.

(56) References Cited

U.S. PATENT DOCUMENTS

| | | | |
|---|---|---|---|
| 3,896,125 | A | 7/1975 | Helmo et al. |
| 4,286,960 | A | 9/1981 | Schneider et al. |
| 4,389,213 | A | 6/1983 | Schneider et al. |
| 4,708,719 | A | 11/1987 | Wilson et al. |
| 5,189,084 | A | 2/1993 | Birbaum et al. |
| 2007/0287817 | A1 | 12/2007 | Maier et al. |

FOREIGN PATENT DOCUMENTS

| | | |
|---|---|---|
| DE | 102004032399 A1 | 2/2006 |
| DE | 102005052817 B3 | 6/2007 |
| DE | 102006005093 A1 | 8/2007 |
| DE | 102006005094 A1 | 8/2007 |
| EP | 0577122 A1 | 1/1994 |
| WO | WO-99/55453 A1 | 11/1999 |

*Primary Examiner* — Duc Truong
(74) *Attorney, Agent, or Firm* — Drinker Biddle & Reath LLP

(57) ABSTRACT

The invention relates to the use of polycarboxylate ethers for dispersing disperse dyes and UV absorbers. The invention also relates to a preparation containing a disperse dye and/or a UV absorber, further comprising a polycarboxylate ether as a dispersant.

20 Claims, No Drawings

PREPARATIONS COMPRISING DISPERSE DYE AND/OR UV ABSORBER

CROSS-REFERENCE TO RELATED APPLICATIONS

This application is a national stage application (under 35 U.S.C. §371) of PCT/EP2008/062566, filed Sep. 19, 2008, which claims benefit of German application 10 2007 046 745.3, filed Sep. 28, 2007.

BACKGROUND OF THE INVENTION

Disperse dyes and UV absorbers are used in the textile industry for dyeing and finishing hydrophobic fiber materials of polyester in particular. These products are insoluble or sparingly soluble in water, but are applied to the textile material from an aqueous phase. Preparations, i.e., storage-stable formulations for the trade for example, and also treatment liquors and baths obtained therefrom, have to contain dispersants which keep these products in a fine state of subdivision. Dispersants for this purpose are subject to continuous further development and have to meet growing expectations.

Polycarboxylate ethers (PCEs) are polymeric compounds based essentially on acrylic acid or methacrylic acid and esterified with polyether glycols. These compounds are known and are used as concrete superplasticizers. For instance, DE 10 2006 005 093 A1 describes concrete superplasticizer dispersions comprising silicon dioxide and polycarboxylate ethers and DE 10 2006 005 094 A1 describes similar dispersions composed of titanium dioxide and polycarboxylate ethers. DE 10 2005 052 817 B3 describes a self-compacting concrete mixture which likewise contains polycarboxylate ethers. The functioning of these auxiliaries is described in Chem. Unserer Zeit, 2005, 39, 262-273.

It has now been found that, surprisingly, polycarboxylate ethers are very useful for dispersing disperse dyes and UV absorbers.

BRIEF SUMMARY OF THE INVENTION

The present invention accordingly provides for the use of polycarboxylate ethers for dispersing organic pigments, in particular disperse dyes and UV absorbers. The present invention also provides preparations comprising a disperse dye and/or a UV absorber and further comprising a polycarboxylate ether as a dispersant.

DETAILED DESCRIPTION OF THE INVENTION

The preparations of the present invention may comprise disperse dye or UV absorber, but also disperse dye and UV absorber. Disperse dye and UV absorber, respectively, are present in particular in particle sizes of 0.2 and 5 μm, preferably of 0.4 and 1.2 μm.

Preferred preparations according to the present invention comprise 1 to 50 weight percent and more preferably 5 to 40 weight percent of disperse dye and/or UV absorber and 1 to 25 weight percent of polycarboxylate ether.

The preparations of the present invention may further comprise further, customary auxiliaries, in particular anionic surfactants, nonionic surfactants, thickeners, defoaming or foam-suppressing components, so-called "acid donors", wetting, oxidizing, preserving and dustproofing agents and/or solvents.

Anionic surfactants are for example ligninsulfonates, condensation products of naphthalenesulfonates with formaldehyde, alkyl or alkylaryl sulfonates or alkylaryl polyglycol ether sulfates. Nonionic surfactants are for example reaction products of alkylene oxides, as for example ethylene oxide or propylene oxide with alkylatable compounds, for example fatty alcohols, fatty amines, fatty acids, phenols, alkylphenols and carboxamides. "Acid donors" are for example butyrolactone, monochloroacetamide, sodium chloroacetate, sodium dichloroacetate, the sodium salt of 3-chloropropionic acid, monoesters of sulfuric acid such as for example lauryl sulfate, and also sulfuric esters of ethoxylated and propoxylated alcohols, for example butylglycol sulfate.

An oxidizing agent is for example sodium m-nitrobenzenesulfonate, fungicidal preservatives are for example sodium o-phenylphenoxide, sodium pentachlorophenoxide and methyl- and benzylisothiazolones, and the latter may also be substituted.

Any disperse dye is suitable in principle. Disperse dyes are known to one skilled in the art and are extensively described in the literature, for example in the Colour Index published by the British Society of Dyers and Colourists and the American Association of Textile Chemists and Colorists.

Preferred disperse dyes are in particular monoazo, anthraquinone, quinophthalone and methine dyes and also coumarins.

Particularly preferred disperse dyes are azo dyes of the formula (I)

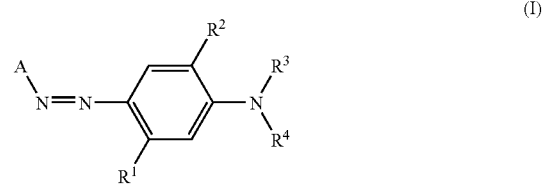

(I)

where
A represents the residue of a diazo component
$R^1$ represents hydrogen, $(C_1-C_4)$-alkyl, $(C_1-C_4)$-alkoxy, —NHCO$(C_1-C_4)$-alkyl, —NHSO$_2(C_1-C_4)$-alkyl or halogen;
$R^2$ represents hydrogen, $(C_1-C_4)$-alkyl or $(C_1-C_4)$-alkoxy; and
$R^3$ and $R^4$ independently represent hydrogen, $(C_2-C_4)$-alkenyl, $(C_1-C_4)$-alkyl or $(C_1-C_4)$-alkyl substituted by cyano, hydroxyl, phenoxy, $(C_1-C_4)$-alkoxy, —OCO$(C_1-C_4)$-alkyl, —OCOphenyl, —COO$(C_1-C_4)$-alkyl, —OCOO$(C_1-C_4)$-alkyl or —OCOOphenyl.

Examples of group A conform in particular to the formula (II)

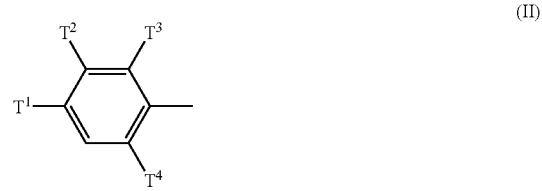

(II)

where
$T^1$ and $T^2$ independently represent hydrogen, halogen, $(C_1-C_4)$-alkyl, $(C_1-C_4)$-alkoxy, cyano, —SO$_2(C_1-C_4$-alkyl) or nitro; and
$T^3$ and $T^4$ independently represent hydrogen, halogen, trifluoromethyl, cyano, —SO$_2$CH$_3$, —SCN or nitro;

or to the formula (III)

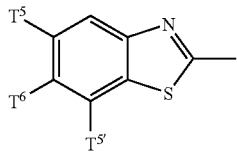

where
T⁵ and T⁵' independently represent hydrogen or halogen; and T⁶ represents hydrogen, —SO₂CH₃, —SCN, ($C_1$-$C_4$)-alkoxy, halogen or nitro;
or to the formula (IV)

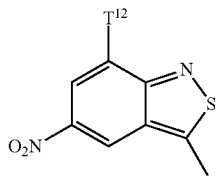

where
$T^{12}$ represents hydrogen or halogen;
or to the formula (IVa)

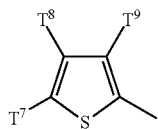

where
$T^7$ represents nitro, —CHO, cyano, —COCH₃ or a group of the formula

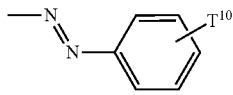

where $T^{10}$ represents hydrogen, halogen, nitro or cyano;
$T^8$ represents hydrogen, ($C_1$-$C_6$)-alkyl or halogen; and
$T^9$ represents nitro, cyano, —COCH₃ or —COOT¹¹; where $T^{11}$ represents ($C_1$-$C_4$)-alkyl.

Further particularly preferred disperse dyes are anthraquinone dyes of the formula (V)

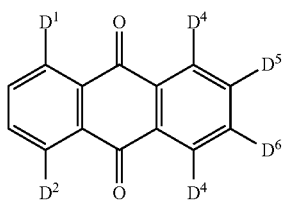

where
$D^1$ and $D^2$ independently represent hydrogen, hydroxyl, amino or nitro;
$D^3$ and $D^4$ independently represent hydroxyl, amino or —NHR⁵;
$D^5$ and $D^6$ independently represent hydrogen, halogen, cyano, ($C_1$-$C_6$)-alkoxy, hydroxy-($C_1$-$C_6$)-alkoxy, phenoxy-($C_1$-$C_6$)-alkoxy, phenoxy, phenoxy substituted by ($C_1$-$C_4$)-alkyl, cyano-($C_1$-$C_6$)-alkyl, hydroxyl, halogen, ($C_1$-$C_4$)-alkoxy or ($C_1$-$C_4$)-alkyl-COO—($C_1$-$C_4$)-alkyl, phenyl, phenyl substituted by hydroxyl, ($C_1$-$C_4$)-alkyl or ($C_1$-$C_4$)-alkoxy, —SO₂O phenyl, —CO($C_1$-$C_4$)-alkyl or —COO($C_1$-$C_4$)-alkyl; and
$R^5$ represents ($C_1$-$C_4$)-alkyl, hydroxy-($C_1$-$C_4$)-alkyl, phenyl, phenyl substituted by ($C_1$-$C_4$)-alkyl, ($C_1$-$C_4$)-alkoxy, hydroxy-($C_1$-$C_4$)-alkyl, —OSO₂($C_1$-$C_4$)-alkyl or halogen, —SO₂-phenyl or —SO₂-phenyl substituted by ($C_1$-$C_4$)-alkyl in the phenyl radical; or
where
$D^5$ and $D^6$ together represent —CONR⁵'CO— and combine with the joining carbon atoms to form a five-membered ring, where
R5' represents ($C_1$-$C_4$)-alkyl, ($C_1$-$C_4$)-alkoxy-($C_2$-$C_4$)-alkyl or ($C_1$-$C_4$)-alkoxy-($C_2$-$C_4$)-alkoxy-($C_2$-$C_4$)-alkyl.

Further particularly preferred disperse dyes are quinophthalone dyes of the formula (VI)

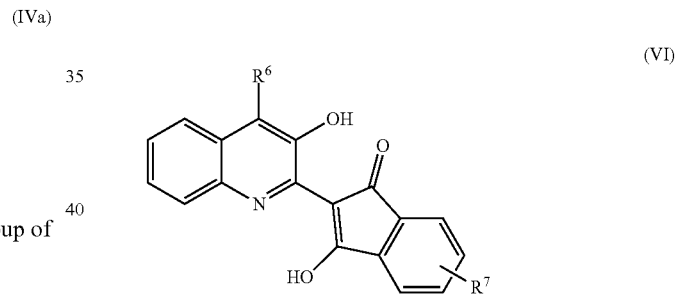

where
$R^6$ represents hydrogen or halogen, in particular bromine;
$R^7$ represents hydrogen or —COOR⁸, and
$R^8$ represents hydrogen, ($C_1$-$C_4$)-alkyl or ($C_1$-$C_4$)-alkoxy-($C_1$-$C_4$)-alkoxy.

Further particularly preferred disperse dyes are methine dyes of the formulae (VII), (VIIb), (VIIc) and (VIId)

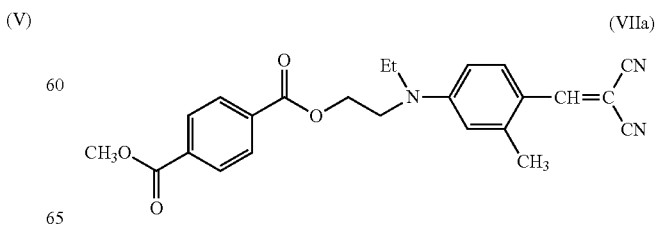

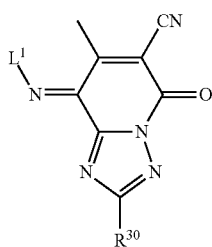

where
L¹ represents a 5- or 6-membered carbocyclic or heterocyclic radical, preferably phenyl, substituted phenyl, thiazolyl, substituted thiazolyl, thienyl or substituted thienyl, in which case useful substitutents include in particular $(C_1-C_4)$-alkyl, $(C_1-C_4)$-alkoxy, hydroxyl, cyano, nitro and halogen; and
$R^{30}$ represents $(C_1-C_{20})$-alkyl, which may be straight chain and branched;

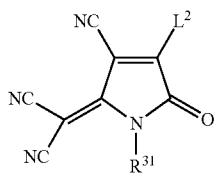

where
L² represents aryl and
$R^{31}$ represents hydrogen, $(C_1-C_{20})$-alkyl or $(C_2-C_{20})$-alkenyl;

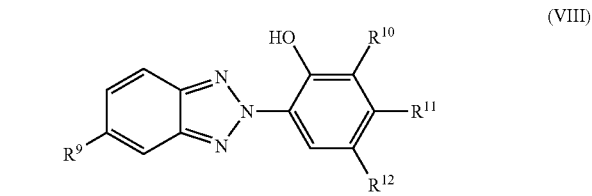

where
$R^{32}$ represents hydrogen or $(C_1-C_4)$-alkyl,
$R^{33}$ and $R^{34}$ independently represent $(C_1-C_{20})$-alkyl, which may be straight chain and branched.

Particularly preferred dyes for the purposes of this invention are the Colour Index dyes
C. I. Disperse Yellow 3, 4, 5, 7, 9, 13, 24, 30, 33, 34, 42, 49, 50, 51, 54, 56, 58, 60, 63, 64, 65, 66, 68, 71, 74, 76, 79, 82, 83, 85, 86, 88, 90, 91, 93, 98, 99, 100, 104, 108, 114, 116, 118, 119, 122, 124, 126, 135, 140, 141, 148, 149, 160, 162, 163, 164, 165, 179, 180, 182, 183, 184, 184:1, 186, 192, 198, 199, 202, 204, 210, 211, 215, 216, 218, 224, 227, 230, 235, 241 and 246;
C. I. Disperse Orange 1, 3, 5, 7, 11, 13, 17, 20, 21, 25, 29, 30, 31, 32, 33, 37, 38, 42, 43, 44, 45, 47, 48, 49, 50, 53, 54, 56, 57, 58, 59, 60, 61, 62, 66, 71, 73, 76, 78, 80, 89, 90, 91, 96, 97, 119, 127, 128, 130, 139, 142, 146, 148, 151 and 157;
C. I. Disperse Red 1, 4, 5, 77, 11, 12, 13, 15, 17, 27, 43, 44, 50, 52, 53, 54, 55, 56, 58, 59, 60, 65, 72, 73, 74, 75, 76, 78, 81, 82, 86, 88, 90, 91, 92, 93, 96, 103, 105, 106, 107, 108, 110, 111, 113, 117, 118, 121, 122, 127, 128, 131, 132, 134, 135, 137, 143, 145, 146, 151, 152, 153, 154, 157, 158, 159, 164, 167, 169, 177, 178, 179, 181, 182, 183, 184, 185, 188, 189, 190, 191, 192, 200, 201, 202, 203, 205, 206, 207, 208, 210, 221, 224, 225, 227, 229, 239, 240, 257, 258, 263, 272, 277, 278, 279, 281, 282, 283, 288, 296, 302, 303, 310, 311, 312, 320, 324, 328, 343, 356, 364, 367, 369, 376, 377, 378, 381, 382, 383 and 385;
C. I. Violet 1, 4, 8, 17, 23, 26, 27, 28, 31, 33, 35, 36, 38, 40, 43, 46, 48, 50, 52, 56, 57, 59, 61, 63, 69, 77, 90, 93, 94, 95, 98 and 107;
C.I. Blue 3, 7, 9, 14, 16, 19, 20, 26, 27, 35, 43, 44, 54, 55, 56, 58, 60, 62, 64, 70, 72, 73, 74, 75, 77, 79, 81, 82, 83, 84, 85, 87, 91, 93, 94, 95, 06, 102, 104, 106, 108, 112, 113, 115, 118, 119, 120, 122, 125, 128, 130, 131, 139, 141, 142, 143, 145, 146, 148, 149, 152, 153, 154, 158, 165, 171, 173, 174, 178, 181, 183, 185, 186, 187, 189, 197, 198, 200, 201, 205, 207, 211, 214, 224, 225, 257, 259, 267, 268, 270, 280, 284, 285, 286, 287, 288, 291, 293, 295, 297, 301, 315, 321, 330, 333, 341, 354, 356, 358, 367, 369, 371, 378 and 379;
C. I. Disperse Green 9;
C. I. Disperse Brown 1, 2, 4, 9, 13, 16 and 19;
C. I. Disperse Black 1, 3, 10 and 24;
C. I. Solvent Yellow 163; and
C. I. Solvent Orange 60.

Contemplated UV absorbers are in particular those from the group of the substituted benzophenones, benzoxazinones, benzotriazoles and triazines.

Particularly preferred UV absorbers are benzotriazoles of the formula (VIII)

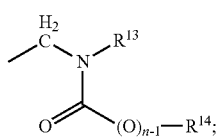

where
$R^9$ represents hydrogen, halogen, $(C_1-C_{12})$-alkyl, $(C_2-C_{12})$-alkenyl, $(C_1-C_{12})$-alkoxy or $(C_2-C_{12})$-alkenoxy;
$R^{10}$ represents hydrogen, halogen, $(C_1-C_{12})$-alkyl, $(C_2-C_{12})$-alkenyl, $(C_1-C_{12})$-alkoxy, $(C_2-C_{12})$-alkenoxy, aryl-$(C_1-C_4)$-alkyl, aryl-$(C_1-C_4)$-alkyl, where the aryl group is substituted, or a group of the formula (IX)

(IX)

$R^{11}$ represents hydrogen, hydroxyl, $(C_7-C_{10})$-aralkyloxy, benzoyloxy or substituted benzoyloxy; and
$R^{12}$ represents hydrogen, halogen, benzoyl, substituted benzoyl, $(C_1-C_{12})$-alkyl, $(C_2-C_{12})$-alkenyl, $(C_1-C_{12})$-alkoxy, $(C_7-C_{10})$-aralkyl, $(C_2-C_{12})$-alkenoxy or a group of the formula (IX);

$R^{13}$ represents hydrogen, $(C_1-C_{10})$-alkyl, $(C_2-C_{12})$-alkenyl, —CO$(C_1-C_{10})$-alkyl, —CO$(C_2-C_{12})$-alkenyl, $(C_5-C_8)$-cycloalkyl, $(C_7-C_{10})$-aralkyl or $(C_6-C_{10})$-aryl;

$R^{14}$ represents $(C_1-C_{20})$-alkyl, $(C_2-C_{17})$-alkenyl, $(C_5-C_8)$-cycloalkyl, $(C_7-C_{10})$-aralkyl, $(C_6-C_{10})$-aralkenyl or $(C_6-C_{10})$-aryl; and n represents 1 or 2;

and when n is =1, $R^{13}$ and $R^{14}$ may combine with their supporting atoms to form a mono- or polynuclear 5- to 8-membered heterocycle.

In particularly preferred benzotriazoles of the formula (VIII), $R^9$ represents hydrogen, methyl or chlorine;

$R^{10}$ represents hydrogen or $(C_1-C_5)$-alkyl, in particular tert-butyl; and $R^{12}$ represents $(C_1-C_5)$-alkyl, in particular methyl.

Further particularly preferred UV absorbers are triazines of the formula (X)

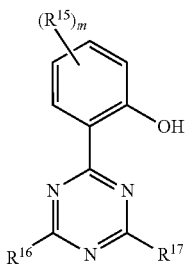

(X)

where $R^{15}$ represents $(C_1-C_4)$-alkyl, $(C_1-C_4)$-alkoxy, halogen or hydroxyl;

$R^{16}$ and $R^{17}$ independently represent $(C_1-C_4)$-alkylthio, $(C_1-C_4)$-alkoxy, $(C_1-C_{18})$-alkyl, hydroxyl-, halogen-, $(C_1-C_4)$-alkoxy-, $(C_1-C_4)$-alkylthio-, amino- or mono- or di-$(C_1-C_4)$-alkylamino-substituted $(C_1-C_{18})$-alkyl, phenyl or chlorine-, hydroxyl-, $(C_1-C_4)$-alkyl- or $(C_1-C_8)$-alkoxy-mono-substituted or -polysubstituted phenyl; and m represents 0, 1 or 2.

m in the triazine of the formula (X) is preferably 1, in which case $R^{15}$ is preferably attached meta relation to the hydroxyl group.

A very particularly preferred UV absorber conforms to the formula (XXII)

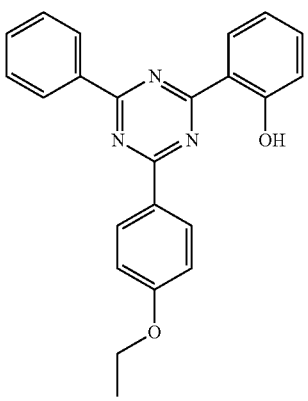

(XXII)

The UV absorbers mentioned are known and are obtainable by known methods and are commercially available.

For instance, the UV absorbers of the formula X are obtainable by heating an amidine and an o-hydroxybenzenecarboxylic ester, preferably in an approximate ratio of 2:1 in boiling organic solvents, see U.S. Pat. No. 3,896,125 and Helv. Chim. Acta 1972, 55, 1566.1595.

Polycarboxylate ethers to be used according to the present invention or to be more precise polycarboxylate ethers present in preparations of the present invention are in particular copolymers of acrylic acid and/or methacrylic acid which are esterified with polyether glycols. They may preferably comprise further constituents. More preferably they comprise the hereinbelow defined structural repeat units A, B and C.

The structural repeat unit A is a mono- or dicarboxylic acid derivative and conforms to the formula (XIa), (XIb) or (XIc)

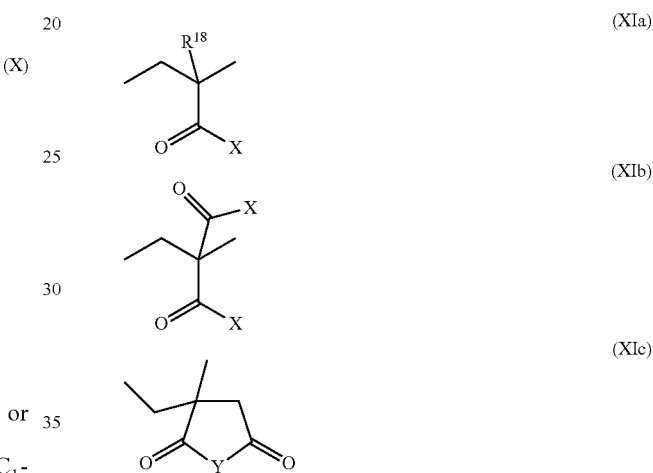

where $R^{18}$ represents hydrogen or $(C_1-C_{20})$-alkyl;

X represents —OM$_a$, —O—$(C_pH_{2p}O)_q$—R$^{19}$ and/or —NH—$(C_pH_{2p}O)_q$—R$^{19}$;

Y represents O or NR$^{19}$;

M represents hydrogen, a uni- or bivalent metal cation, ammonium or an organic amine radical;

$R^{19}$ represents hydrogen, $(C_1-C_{20})$-alkyl, $(C_2-C_{20})$-alkenyl, $(C_5-C_8)$-cycloalkyl, $(C_6-C_{14})$-aryl, hydroxyl-, carboxyl- or sulfo-substituted $(C_6-C_{14})$-aryl;

p represents a whole number from 2 to 4;

q represents a number from 0 to 200;

and a represents 1 when M represents a univalent cation and represents ½ when M represents a bivalent cation.

An organic amine radical M is preferably a substituted ammonium group derived from primary, secondary or tertiary $(C_1-C_{20})$-alkylamines, $(C_1-C_{20})$-alkanolamines or $(C_5-C_8)$-cycloalkylamines. Examples of the corresponding amines are methylamine, dimethylamine, trimethylamine, ethanolamine, diethanolamine, triethanolamine, methyldiethanolamine, cyclohexylamine, dicyclohexylamine, phenylamine and diphenylamine in the protonated (ammonium) form.

$R^{18}$ preferably represents methyl.

p preferably represents 2 or 3.

The structural repeat unit B conforms to the formula (XII)

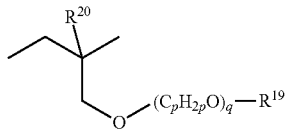
(XII)

where
p, q and $R^{19}$ are each as defined above and
$R^{20}$ represents hydrogen or $(C_1\text{-}C_4)$-alkyl or $(C_2\text{-}C_5)$-alkenyl.

The structural repeat unit C conforms to the formulae (XIIIa) or (XIIIb)

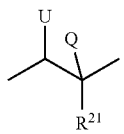
(XIIIa)

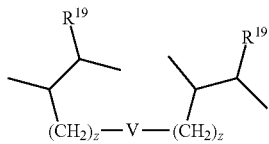
(XIIIb)

where
$R^{21}$ represents hydrogen or methyl;
U represents hydrogen, —$COOM_a$ or —$COOR^{22}$;
Q represents —$COOR^{22}$;
$R^{22}$ represents $(C_3\text{-}C_{20})$-alkyl, $(C_3\text{-}C_{20})$-alkenyl, $(C_5\text{-}C_8)$-cycloalkyl, preferably cyclopentyl or cyclohexyl, or $(C_6\text{-}C_{14})$-aryl, preferably phenyl or naphthyl;
$R^{19}$ is as defined above,
V represents a polydimethylsiloxane radical of the formula (XVI) or —O—CO—$C_6H_4$—CO—O—; and
z represents a value from 0 to 4.

The structural repeat unit C may optionally also comprise groups of the formulae (XIV) and/or (XV).

In the group of the formula (XIV)

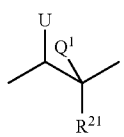
(XIV)

U and $R^{21}$ are each as defined above
and $Q^1$ conforms to the formula

-$E^1$-(CH($CH_3$)—$CH_2$—O)$_x$—($CH_2$—$CH_2$—O)$_y$—$R^{23}$ where
$E^1$ represents —CO—NH—, —O— or —$CH_2$—O—;
x represents a number from 1 to 150; and
y represents a number from 0 to 15; and
$R^{23}$ has one of the meanings of $R^{19}$ or represents a group of the formula

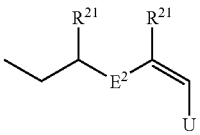

where $R^{21}$ and U are each as defined above and
$E^2$ represents —NH—CO—, —O— or —O—$CH_2$—.

In the group of the formula (XV)

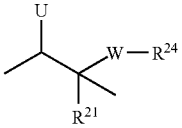
(XV)

U and $R^{21}$ are each as defined above;
W represents a group of the formula (XVI), (XVII) or (XVIII)

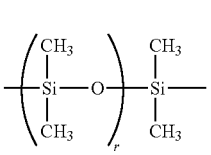
(XVI)

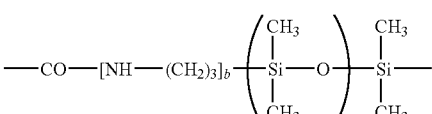
(XVII)

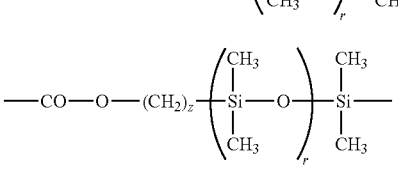
(XVIII)

where
b represents 1 or 2;
r represents a number from 2 to 100;
z represents a number from 0 to 4; and
$R^{24}$ has one of the meanings of $R^{19}$ or represents a group of the formula (XIX) or (XX)

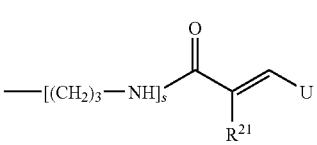
(XIX)

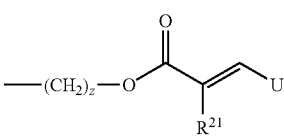
(XX)

where $R^{21}$, U and z are each as defined above and s represents 1 or 2.

Polycarboxylate ethers to be used according to the present invention or to be more precise polycarboxylate ethers present in preparations of the present invention may further comprise the structural repeat unit D as well as the structural repeat units A, B and C. The structural repeat unit D conforms to the formula (XXIa) or (XXIb)

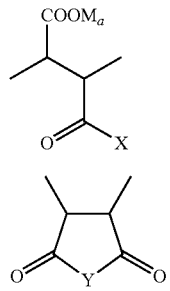

(XXIa)

(XXIb)

where X, Y and $M_a$ are each as defined above.

When the structural repeat unit D is additionally present, the proportions of structural repeat units present are preferably 55 to 75 mol % of structural repeat unit A, 19.5 to 39.5 mol % of structural repeat unit B, 0.5 to 2 mol % of structural repeat unit C and 5 to 20 mol % of structural repeat unit D.

Polycarboxylate ethers particularly preferably to be used according to the present invention or to be more precise present in preparations of the present invention, as well as the structural repeat units A to D, comprise 1 to 50 mol %, in particular 1 to 20 mol % based on the sum total of the structural repeat units A to D, of structures resting on monomers based on vinylic or (meth)acrylic acid derivatives such as styrene, methylstyrene, vinyl acetate, vinyl propionate, ethylene, propylene, isobutene, hydroxyalkyl(meth)acrylates, acrylamide, methacrylamide, N-vinylpyrrolidone, allylsulfonic acid, methallylsulfonic acid, vinylsulfonic acid, vinylphosphonic acid, AMPS, methyl methacrylate, methyl acrylate, butyl acrylate, allylhexyl acrylate and so on.

In the above definitions of the compounds of the formulae (I) to (XXI), alkyl groups may be straight chain or branched. Examples are in particular methyl, ethyl, n-propyl, i-propyl, n-butyl, isobutyl, sec-butyl, tert-butyl, amyl, isoamyl, tert-amyl, n-hexyl, 2-ethylhexyl, n-heptyl, isooctyl, n-nonyl, isononyl, n-dodecyl, heptadecyl and octadecyl. The same logic applies to alkoxy, alkenoxy and alkylene groups, the first representing in particular methoxy, ethoxy, propoxy, isopropoxy, butoxy, isobutoxy, sec-butoxy or tert-butoxy. Alkylthio is for example methylthio, ethylthio, propylthio, isopropylthio, butylthio, isobutylthio, sec-butylthio and tert-butylthio.

Cycloalkyl groups are in particular cyclopentyl, cyclohexyl and cycloheptyl, more preferably cyclohexyl.

Aralkyl groups are in particular benzyl and phenethyl, while aryl is in particular phenyl or naphthyl.

Halogen is in particular chlorine and bromine, of which chlorine is preferred.

The polycarboxylate ethers to be used according to the invention or to be more precise present in preparations of the present invention preferably have molecular weights in the range from 5000 to 50 000 and more preferably in the range from 20 000 to 40 000.

It has been determined that the polycarboxylate ethers available from BASF Construction Polymers GmbH under the trade names of Melpers® 9360 and Melpers® 9560 are particularly preferred.

The polycarboxylate ethers to be used according to the invention or to be more precise present in the preparations of the present invention are obtainable by known methods, for example by the method described in DE 10 2006 005 094 A1.

The preparations of the present invention are obtainable by known methods. They are obtained in particular by slurrying the disperse dye and/or the UV absorber together with the dispersant in a liquid medium, preferably in water, and subjecting the mixture to the action of shearing forces to mechanically comminute the dye and UV absorber particles originally present to such an extent that an optimal specific surface area is achieved and sedimentation is minimized. This is accomplished in suitable mills, such as ball or sand mills. The particle size of the dyes and/or UV absorbers is generally between 0.5 and 5 µm and preferably between 0.8 and 1.2 µm.

The preparations thus obtained should be pourable for most applications. Accordingly, the dye, UV absorber and dispersant content is limited in these cases. In general, the preparations are adjusted to a dye and/or UV absorber content of 15 to 50 weight percent and a dispersant content of 5 to 25 weight percent.

When the preparations of the present invention comprise further auxiliaries, these are added in the desired amount in the course of the method of preparation described above.

The dye dispersions thus obtained are very advantageous for making up dyeing liquors and print pastes.

The aqueous, i.e., liquid, preparations of the present invention described are preferred, but powder formulations are preferred for certain fields of use. These powders comprise the dye or UV absorber, dispersant and, if appropriate, other auxiliaries.

A preferred way of making pulverulent preparations consists in stripping the above-described liquid preparations of their liquid, for example by vacuum drying, freeze drying, by drying on drum dryers, but preferably by spray drying.

When the preparations of the present invention comprise disperse dye, they are used for preparing dyeing liquors by diluting them in the requisite amounts with the dyeing medium, preferably with water, such that a liquor ratio of 5:1 to 50:1 is obtained. In addition, it is generally customary to add further dyeing auxiliaries, such as dispersing, wetting and fixing auxiliaries, to the liquors. Organic and inorganic acids such as acetic acid, succinic acid, boric acid or phosphoric acid are added to set a pH in the range from 4 to 5, preferably 4.5. It is advantageous to buffer the pH setting and to add a sufficient amount of a buffering system. The acetic acid/sodium acetate system is an example of an advantageous buffering system.

To use a disperse dye preparation of the present invention in textile printing, the requisite amounts of the preparation are kneaded in a conventional manner together with thickeners, for example alkali metal alginates or the like, and if appropriate further additives, for example fixation accelerants, wetting agents and oxidizing agents, to form print pastes.

Example 1

23 parts of 2-(2'-hydroxy-3'-tert-butyl-5'-methylphenyl)-5-chlorobenzotriazole,
14 parts of a 60% by weight solution of a polycarboxylate ether (Melpers® 9560 from BASF Construction Polymers GmbH)
4 parts of a condensation product of naphthalenesulfonic acid with formaldehyde and
48.8 parts of demineralized water
are mixed in a glass bead mill.

The mixture is milled with the same amount of glass beads about 0.4-0.6 mm in diameter until the particle size is at least less than 5 μm and subsequently the dispersion is separated from the glass beads.

While the mixture is being stirred
1.4 parts of a biocidal combination and
8.8 parts of demineralized water
are added and stirred in until homogeneous.

This gives a storable dispersion.

Example 2

23 parts of 2-(2'-hydroxy-3'-tert-butyl-5'-methylphenyl)-5-chlorobenzotriazole,
14 parts of a 60% by weight solution of a polycarboxylate ether (Melpers 9360 from BASF Construction Polymers GmbH)
4 parts of a condensation product of naphthalenesulfonic acid with formaldehyde and
48.8 parts of demineralized water
are mixed in a glass bead mill.

The mixture is milled with the same amount of glass beads about 0.4-0.6 mm in diameter until the particle size is at least less than 5 μm and subsequently the dispersion is separated from the glass beads.

While the mixture is being stirred
1.4 parts of a biocidal combination and
8.8 parts of demineralized water
are added and stirred in until homogeneous.

This gives a storable dispersion.

Example 3

12.5 parts of a commercially available UV absorber of the triazine type of the formula XXII

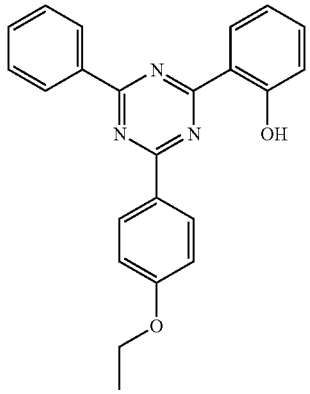

(XXII)

14 parts of a 60% by weight solution of a polycarboxylate ether (Melpers® 9560 from BASF Construction Polymers GmbH)
4 parts of a condensation product of naphthalenesulfonic acid with formaldehyde and
69.5 parts of demineralized water
are mixed in a glass bead mill.

The mixture is milled with the same amount of glass beads about 0.4-0.6 mm in diameter until the particle size is at least less than 5 μm and subsequently the dispersion is separated from the glass beads.

This gives a storable dispersion.

Example 4

12.5 parts of a UV absorber of the triazine type of the formula XXII
14 parts of a 60% by weight solution of a polycarboxylate ether (Melpers® 9560 from BASF Construction Polymers GmbH)
16.6 parts of a 30% by weight solution of a modified polyvinylpyrrolidone and
46.7 parts of demineralized water
are mixed in a glass bead mill.

The mixture is milled with the same amount of glass beads about 0.4-0.6 mm in diameter until the particle size is at least less than 5 μm and subsequently the dispersion is separated from the glass beads.

While the mixture is being stirred
1.4 parts of a biocidal combination and
8.8 parts of demineralized water
are added and stirred in until homogeneous.

This gives a storable dispersion.

Example 5

10 parts of C.I. Disperse Blue 284
10 parts of a 60% by weight solution of a polycarboxylate ether (Melpers® 9560 from BASF Construction Polymers GmbH)
6 parts of a condensation product of naphthalenesulfonic acid with formaldehyde and
63.8 parts of demineralized water
are mixed in a glass bead mill.

The mixture is milled with the same amount of glass beads about 0.4-0.6 mm in diameter until the particle size is at least less than 5 μm and subsequently the dispersion is separated from the glass beads.

While the mixture is being stirred
1.4 parts of a biocidal combination and
8.8 parts of demineralized water
are added and stirred in until homogeneous.

This gives a storable dispersion.

Example 6

21 parts of C.I. Disperse Blue 60 M
14 parts of a 60% by weight solution of a polycarboxylate ether (Melpers® 9560 from BASF Construction Polymers GmbH) and
54.8 parts of demineralized water
are mixed in a glass bead mill.

The mixture is milled with the same amount of glass beads about 0.4-0.6 mm in diameter until the particle size is at least less than 5 μm and subsequently the dispersion is separated from the glass beads.

While the mixture is being stirred
1.4 parts of a biocidal combination and
8.8 parts of demineralized water
are added and stirred in until homogeneous.

This gives a storable dispersion.

What is claimed is:

1. A dispersant for dispersing disperse dyes or UV absorbers comprising a polycarboxylate ether and wherein the polycarboxylate ether has a molecular weight from 5,000 to 50,000.

2. A preparation comprising a disperse dye and/or a UV absorber, further comprising a polycarboxylate ether as a dispersant and wherein the polycarboxylate ether has a molecular weight from 5,000 to 50,000.

3. The preparation as claimed in claim 2 comprising 1 to 50 weight percent of a disperse dye and/or of a UV absorber and 1 to 25 weight percent of a polycarboxylate ether.

4. The preparation as claimed in claim 2, wherein the disperse dye is a monoazo, anthraquinone, quinophthalone, methine or coumarin disperse dye.

5. The preparation as claimed in claim 2, wherein the disperse dye is an azo dye of the formula (I)

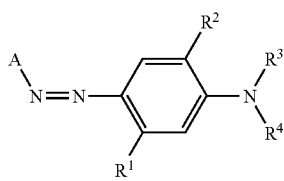

(I)

where
A represents the residue of a diazo component
$R^1$ represents hydrogen, $(C_1$-$C_4)$-alkyl, $(C_1$-$C_4)$-alkoxy, —NHCO$(C_1$-$C_4)$-alkyl, —NHSO$_2(C_1$-$C_4)$-alkyl or halogen;
$R^2$ represents hydrogen, $(C_1$-$C_4)$-alkyl or $(C_1$-$C_4)$-alkoxy; and
$R^3$ and $R^4$ independently represent hydrogen, $(C_2$-$C_4)$-alkenyl, $(C_1$-$C_4)$-alkyl or $(C_1$-$C_4)$-alkyl substituted by cyano, hydroxyl, phenoxy, $(C_1$-$C_4)$-alkoxy, —OCO$(C_1$-$C_4)$-alkyl, —OCOphenyl, —COO$(C_1$-$C_4)$-alkyl, —OCOO$(C_1$-$C_4)$-alkyl or —OCOOphenyl;
or an anthraquinone dye of the formula (V)

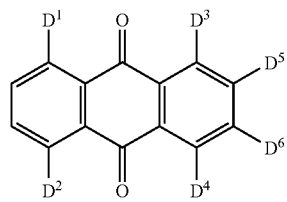

(V)

wherein
$D^1$ and $D^2$ independently represent hydrogen, hydroxyl, amino or nitro;
$D^3$ and $D^4$ independently represent hydroxyl, amino or —NHR$^5$;
$D^5$ and $D^6$ independently represent hydrogen, halogen, cyano, $(C_1$-$C_6)$-alkoxy, hydroxy-$(C_1$-$C_6)$-alkoxy, phenoxy-$(C_1$-$C_6)$-alkoxy, phenoxy, phenoxy substituted by $(C_1$-$C_4)$-alkyl, cyano-$(C_1$-$C_6)$-alkyl, hydroxyl, halogen, $(C_1$-$C_4)$-alkoxy or $(C_1$-$C_4)$-alkyl-COO—$(C_1$-$C_4)$-alkyl, phenyl, phenyl substituted by hydroxyl, $(C_1$-$C_4)$-alkyl or $(C_1$-$C_4)$-alkoxy, —SO$_2$Ophenyl, —CO$(C_1$-$C_4)$-alkyl or —COO$(C_1$-$C_4)$-alkyl; and
$R^5$ represents $(C_1$-$C_4)$-alkyl, hydroxy-$(C_1$-$C_4)$-alkyl, phenyl, phenyl substituted by $(C_1$-$C_4)$-alkyl, $(C_1$-$C_4)$-alkoxy, hydroxy-$(C_1$-$C_4)$-alkyl, —OSO$_2(C_1$-$C_4)$-alkyl or halogen, —SO$_2$-phenyl or —SO$_2$-phenyl substituted by $(C_1$-$C_4)$-alkyl in the phenyl radical;
or where
$D^5$ and $D^6$ together represent —CONR$^{5'}$CO— and combine with the joining carbon atoms to form a five-membered ring, where R5' represents $(C_1$-$C_4)$-alkyl, $(C_1$-$C_4)$-alkoxy-$(C_2$-$C_4)$-alkyl or $(C_1$-$C_4)$-alkoxy-$(C_2$-$C_4)$-alkoxy-$(C_2$-$C_4)$-alkyl;
or a quinophthalone dye of the formula (VI)

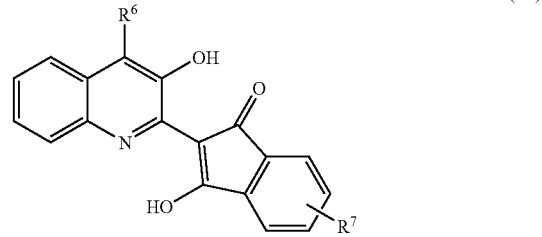

(VI)

where
$R^6$ represents hydrogen or halogen;
$R^7$ represents hydrogen or —COOR$^8$, and
$R^8$ represents hydrogen, $(C_1$-$C_4)$-alkyl or $(C_1$-$C_4)$-alkoxy-$(C_1$-$C_4)$-alkoxy;
or a methine dye of the formulae (VII), (VIIb), (VIIc) or (VIId)

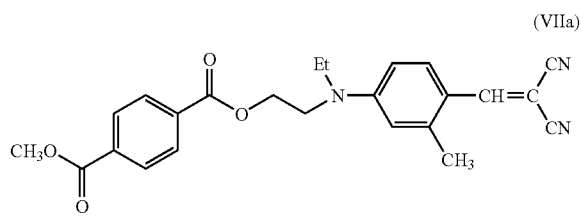

(VIIa)

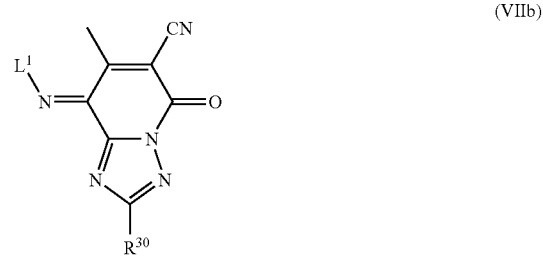

(VIIb)

where
$L^1$ represents a 5- or 6-membered carbocyclic or heterocyclic radical and
$R^{30}$ represents $(C_1$-$C_{20})$-alkyl, which may be straight chain and branched;

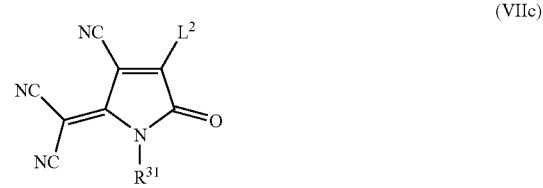

(VIIc)

where

L² represents aryl and

R³¹ represents hydrogen, (C₁-C₂₀)-alkyl or (C₂-C₂₀)-alkenyl;

(VIId)

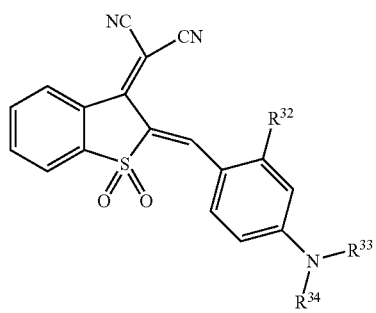

where

R³² represents hydrogen or (C₁-C₄)-alkyl,

R³³ and R³⁴ independently represent (C₁-C₂₀)-alkyl, which may be straight chain and branched.

6. The preparation as claimed in claim 5, wherein R⁶ represents bromine.

7. The preparation as claimed in claim 5, wherein A conforms to the formula (II)

(II)

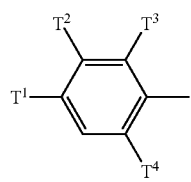

where

T¹ and T² independently represent hydrogen, halogen, (C₁-C₄)-alkyl, (C₁-C₄)-alkoxy, cyano, —SO₂(C₁-C₄-alkyl) or nitro; and T³ and T⁴ independently represent hydrogen, halogen, trifluoromethyl, cyano, —SO₂CH₃, —SCN or nitro;

or to the formula (III)

(III)

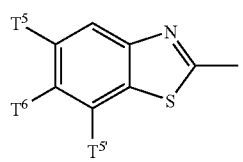

where

T⁵ and T⁵' independently represent hydrogen or halogen; and

T⁶ represents hydrogen, —SO₂CH₃, —SCN, (C₁-C₄)-alkoxy, halogen or nitro;

or to the formula (IV)

(IV)

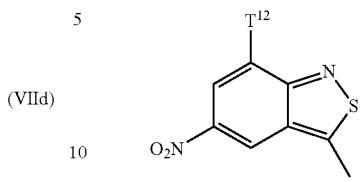

where

T¹² represents hydrogen or halogen;

or to the formula (IVa)

(IVa)

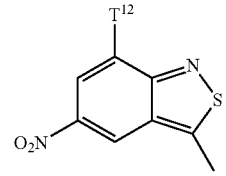

where

T⁷ represents nitro, —CHO, cyano, —COCH₃ or a group of the formula

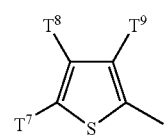

where T¹⁰ represents hydrogen, halogen, nitro or cyano;

T⁸ represents hydrogen, (C₁-C₆)-alkyl or halogen; and

T⁹ represents nitro, cyano, —COCH₃ or —COOT¹¹; where T¹¹ represents (C₁-C₄)-alkyl.

8. The preparation as claimed in claim 2, wherein the UV absorber is a benzotriazole of the formula (VIII)

(VIII)

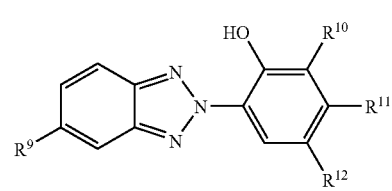

where

R⁹ represents hydrogen, halogen, (C₁-C₁₂)-alkyl, (C₂-C₁₂)-alkenyl, (C₁-C₁₂)-alkoxy or (C₂-C₁₂)-alkenoxy;

R¹⁰ represents hydrogen, halogen, (C₁-C₁₂)-alkyl, (C₂-C₁₂)-alkenyl, (C₁-C₁₂)-alkoxy, (C₂-C₁₂)-alkenoxy, aryl-(C₁-C₄)-alkyl, aryl-(C₁-C₄)-alkyl, where the aryl group is substituted, or a group of the formula (IX)

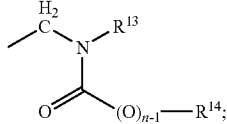
(IX)

$R^{11}$ represents hydrogen, hydroxyl, $(C_7\text{-}C_{10})$-aralkyloxy, benzoyloxy or substituted benzoyloxy; and $R^{12}$ represents hydrogen, halogen, benzoyl, substituted benzoyl, $(C_1\text{-}C_{12})$-alkyl, $(C_2\text{-}C_{12})$-alkenyl, $(C_1\text{-}C_{12})$-alkoxy, $(C_7\text{-}C_{10})$-aralkyl, $(C_2\text{-}C_{12})$-alkenoxy or a group of the formula (IX);

$R^{13}$ represents hydrogen, $(C_1\text{-}C_{10})$-alkyl, $(C_2\text{-}C_{12})$-alkenyl, $-CO(C_1\text{-}C_{10})$-alkyl, $-CO(C_2\text{-}C_{12})$-alkenyl, $(C_5\text{-}C_8)$-cycloalkyl, $(C_7\text{-}C_{10})$-aralkyl or $(C_6\text{-}C_{10})$-aryl;

$R^{14}$ represents $(C_1\text{-}C_{20})$-alkyl, $(C_2\text{-}C_{17})$-alkenyl, $(C_5\text{-}C_8)$-cycloalkyl, $(C_7\text{-}C_{10})$-aralkyl, $(C_6\text{-}C_{10})$-aralkenyl or $(C_6\text{-}C_{10})$-aryl; and n represents 1 or 2;

and when n is =1, $R^{13}$ and $R^{14}$ may combine with their supporting atoms to form a mono- or polynuclear 5- to 8-membered heterocycle;

or a triazine of the formula (X)

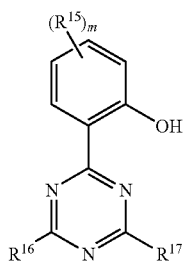
(X)

where $R^{15}$ represents $(C_1\text{-}C_4)$-alkyl, $(C_1\text{-}C_4)$-alkoxy, halogen or hydroxyl;

$R^{16}$ and $R^{17}$ independently represent $(C_1\text{-}C_4)$-alkylthio, $(C_1\text{-}C_4)$-alkoxy, $(C_1\text{-}C_{18})$-alkyl, hydroxyl-, halogen-, $(C_1\text{-}C_4)$-alkoxy-, $(C_1\text{-}C_4)$-alkylthio-, amino- or mono- or di-$(C_1\text{-}C_4)$-alkylamino-substituted $(C_1\text{-}C_{18})$-alkyl, phenyl or chlorine-, hydroxyl-, $(C_1\text{-}C_4)$-alkyl- or $(C_1\text{-}C_8)$-alkoxy-mono-substituted or -polysubstituted phenyl; and m represents 0, 1 or 2.

9. The preparation as claimed in claim 2, wherein the polycarboxylate ether is a copolymer derived from acrylic acid and/or methacrylic acid and esterified with polyether glycols.

10. The preparation as claimed in claim 2, wherein the polycarboxylate ether comprises the structural repeat units A, B and C, wherein the structural repeat unit A conforms to the formula (XIa), (XIb) or (XIc)

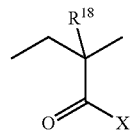
(XIa)

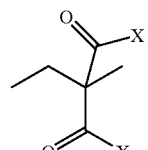
(XIb)

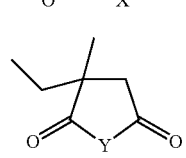
(XIc)

wherein $R^{18}$ represents hydrogen or $(C_1\text{-}C_{20})$-alkyl;

X represents $-OM_a$, $-O-(C_pH_{2p}O)_q-R^{19}$ and/or $-NH-(C_pH_{2p}O)_q-R^{19}$;

Y represents O or $NR^{19}$;

M represents hydrogen, a uni- or bivalent metal cation, ammonium or an organic amine radical;

$R^{19}$ represents hydrogen, $(C_1\text{-}C_{20})$-alkyl, $(C_2\text{-}C_{20})$-alkenyl, $(C_5\text{-}C_8)$-cycloalkyl, $(C_6\text{-}C_{14})$-aryl, hydroxyl-, carboxyl- or sulfo-substituted $(C_6\text{-}C_{14})$-aryl;

p represents a whole number from 2 to 4;

q represents a number from 0 to 200;

and a represents 1 when M represents a univalent cation and represents ½ when M represents a bivalent cation;

the structural repeat unit B conforms to the formula (XII)

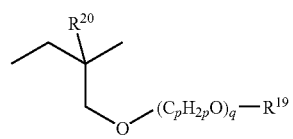
(XII)

where p, q and $R^{19}$ are each as defined above and $R^{20}$ represents hydrogen or $(C_1\text{-}C_5)$-alkyl or $(C_2\text{-}C_5)$-alkenyl;

and the structural repeat unit C conforms to the formula (XIIIa) or (XIIIb)

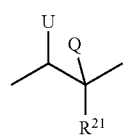
(XIIIa)

-continued

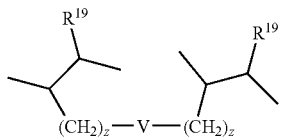
(XIIIb)

where $R^{21}$ represents hydrogen or methyl;

U represents hydrogen, —COOM$_a$ or —COOR$^{22}$;

Q represents —COOR$^{22}$;

$R^{22}$ represents $(C_3-C_{20})$-alkyl, $(C_3-C_{20})$-alkenyl, $(C_5-C_8)$-cycloalkyl, or $(C_6-C_{14})$-aryl;

$R^{19}$ is as defined above,

V represents a polydimethylsiloxane radical of the formula (XVI) or —O—CO—C$_6$H$_4$—CO—O—; and z represents a value from 0 to 4.

11. The preparation as claimed in claim 10, wherein $R^{22}$ represents $(C_3-C_{20})$-alkyl, $(C_3-C_{20})$-alkenyl, cyclopentyl, cyclohexyl, phenyl or naphthyl.

12. The preparation as claimed in claim 7, wherein the polycarboxylate ether comprises the structural repeat units A, B and C, wherein the structural repeat unit A conforms to the formula (XIa), (XIb) or (XIc)

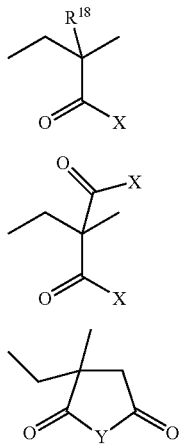

(XIa)

(XIb)

(XIc)

wherein $R^{18}$ represents hydrogen or $(C_1-C_{20})$-alkyl;

X represents —OM$_a$, —O—(C$_p$H$_{2p}$O)$_q$—R$^{19}$ and/or —NH—(C$_p$H$_{2p}$O)$_q$—R$^{19}$;

Y represents O or NR$^{19}$;

M represents hydrogen, a uni- or bivalent metal cation, ammonium or an organic amine radical;

$R^{19}$ represents hydrogen, $(C_1-C_{20})$-alkyl, $(C_2-C_{20})$-alkenyl, $(C_5-C_8)$-cycloalkyl, $(C_6-C_{14})$-aryl, hydroxyl-, carboxyl- or sulfo-substituted $(C_6-C_{14})$-aryl;

p represents a whole number from 2 to 4;

q represents a number from 0 to 200;

and a represents 1 when M represents a univalent cation and represents ½ when M represents a bivalent cation;

the structural repeat unit B conforms to the formula (XII)

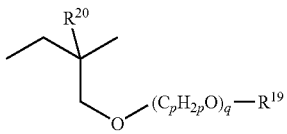
(XII)

where p, q and $R^{19}$ are each as defined above and $R^{20}$ represents hydrogen or $(C_1-C_5)$-alkyl or $(C_2-C_5)$-alkenyl;

and the structural repeat unit C conforms to the formula (XIIIa) or (XIIIb)

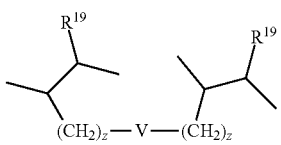

(XIIIa)

(XIIIb)

where $R^{21}$ represents hydrogen or methyl;

U represents hydrogen, —COOM$_a$ or —COOR$^{22}$;

Q represents —COOR$^{22}$;

$R^{22}$ represents $(C_3-C_{20})$-alkyl, $(C_3-C_{20})$-alkenyl, $(C_5-C_8)$-cycloalkyl, or $(C_6-C_{14})$-aryl;

$R^{19}$ is as defined above,

V represents a polydimethylsiloxane radical of the formula (XVI) or —O—CO—C$_6$H$_4$—CO—O—; and z represents a value from 0 to 4.

13. The preparation as claimed in claim 8, wherein the polycarboxylate ether comprises the structural repeat units A, B and C, wherein the structural repeat unit A conforms to the formula (XIa), (XIb) or (XIc)

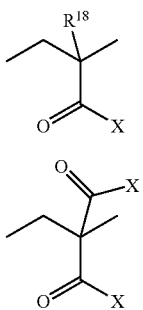

(XIa)

(XIb)

-continued (XIc)

wherein $R^{18}$ represents hydrogen or $(C_1$-$C_{20})$-alkyl;

X represents —$OM_a$, —O—$(C_pH_{2p}O)_9$—$R^{19}$ and/or —NH—$(C_pH_{2p}O)_q$—$R^{19}$;

Y represents O or $NR^{19}$;

M represents hydrogen, a uni- or bivalent metal cation, ammonium or an organic amine radical;

$R^{19}$ represents hydrogen, $(C_1$-$C_{20})$-alkyl, $(C_2$-$C_{20})$-alkenyl, $(C_5$-$C_8)$-cycloalkyl, $(C_6$-$C_{14})$-aryl, hydroxyl-, carboxyl- or sulfo-substituted $(C_6$-$C_{14})$-aryl;

p represents a whole number from 2 to 4;

q represents a number from 0 to 200;

and a represents 1 when M represents a univalent cation and represents ½ when M represents a bivalent cation;

the structural repeat unit B conforms to the formula (XII)

(XII)

where p, q and $R^{19}$ are each as defined above and $R^{20}$ represents hydrogen or $(C_1$-$C_5)$-alkyl or $(C_2$-$C_5)$-alkenyl;

and the structural repeat unit C conforms to the formula (XIIIa) or (XIIIb)

(XIIIa)

-continued (XIIIb)

where $R^{21}$ represents hydrogen or methyl;

U represents hydrogen, —$COOM_a$ or —$COOR^{22}$;

Q represents —$COOR^{22}$;

$R^{22}$ represents $(C_3$-$C_{20})$-alkyl, $(C_3$-$C_{20})$-alkenyl, $(C_5$-$C_8)$-cycloalkyl, or $(C_6$-$C_{14})$-aryl;

$R^{19}$ is as defined above,

V represents a polydimethylsiloxane radical of the formula (XVI) or —O—CO—$C_6H_4$—CO—O—; and z represents a value from 0 to 4.

14. The preparation as claimed in claim 5, wherein the disperse dye is an azo dye of the formula (I).

15. The preparation as claimed in claim 5, wherein the disperse dye is an anthraquinone dye of the formula (V).

16. The preparation as claimed in claim 5, wherein the disperse dye is a quinophthalone dye of the formula (VI).

17. The preparation as claimed in claim 5, wherein the disperse dye is a methine dye of the formulae (VII), (VIIb), (VIIc), or (VIId).

18. The preparation as claimed in claim 8, wherein the UV absorber is a benzotriazole of the formula (VIII).

19. The preparation as claimed in claim 8, wherein the UV absorber is a triazine of the formula (X).

20. The preparation as claimed in claim 2, wherein the disperse dye is

C.I. Disperse Yellow 42, 51, 54, 64, 65, 71, 86, 108, 114 or 163;

C.I. Disperse Orange 29, 30, 32 or 157;

C.I. Disperse Red 82, 86, 91, 92, 127, 146, 159, 167, 184, 191, 202, 258, 279, 302 or 381;

C.I. Disperse Violet 28, 35, 57 or 93;

C.I. Disperse Blue 27, 54, 56, 60, 73, 077, 79, 87, 197, 198, 214, 291, 333 or 379; or C. I. Disperse Brown 19.

* * * * *